(12) United States Patent
Yeckley

(10) Patent No.: US 7,855,159 B1
(45) Date of Patent: *Dec. 21, 2010

(54) ALPHA-BETA SIALON BALLISTIC CERAMIC ARMOR

(75) Inventor: Russell L. Yeckley, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 924 days.

This patent is subject to a terminal disclaimer.

(21) Appl. No.: 11/652,314

(22) Filed: Jan. 11, 2007

(51) Int. Cl.
*C04B 35/599* (2006.01)

(52) U.S. Cl. .................. 501/98.2; 501/98.3; 89/36.02

(58) Field of Classification Search ............... 501/98.2, 501/98.3; 89/36.02
See application file for complete search history.

(56) References Cited

U.S. PATENT DOCUMENTS

| | | | |
|---|---|---|---|
| 4,824,624 A | 4/1989 | Palicka et al. | |
| 4,826,791 A * | 5/1989 | Mehrotra et al. | 501/89 |
| 5,227,346 A | 7/1993 | Hwang et al. | |
| 5,361,678 A | 11/1994 | Roopchand et al. | |
| 5,371,049 A | 12/1994 | Moffett et al. | |
| 5,443,917 A | 8/1995 | Tarry | |
| 5,763,813 A | 6/1998 | Cohen et al. | |
| 6,124,225 A * | 9/2000 | Tien et al. | 501/98.2 |
| 6,139,791 A * | 10/2000 | Chen et al. | 264/642 |
| 6,203,908 B1 | 3/2001 | Cohen | |
| 6,544,913 B2 | 4/2003 | Kim et al. | |
| 6,575,075 B2 * | 6/2003 | Cohen | 89/36.02 |
| 6,693,054 B1 | 2/2004 | Yeckley | |
| 6,709,736 B2 | 3/2004 | Gruber et al. | |
| 6,805,034 B1 | 10/2004 | McCormick et al. | |
| 6,964,933 B2 | 11/2005 | Yeckley | |
| 7,049,256 B2 | 5/2006 | Yeckley | |
| 7,064,095 B2 * | 6/2006 | Mandal et al. | 501/98.2 |
| 7,094,717 B2 * | 8/2006 | Yeckley | 501/98.2 |
| 7,104,177 B1 | 9/2006 | Aghajanian et al. | |
| 7,117,780 B2 | 10/2006 | Cohen | |
| 7,223,709 B2 * | 5/2007 | Yeckley | 501/98.2 |
| 7,309,673 B2 * | 12/2007 | Yeckley | 501/98.2 |
| 7,514,383 B2 * | 4/2009 | Bitterlich et al. | 501/98.2 |
| 2002/0012768 A1 | 1/2002 | Cohen | |
| 2004/0033883 A1 * | 2/2004 | Yeckley | 501/98.2 |
| 2004/0067838 A1 * | 4/2004 | Mandal et al. | 501/98.2 |
| 2004/0102305 A1 * | 5/2004 | Yeckley | 501/98.2 |
| 2005/0189683 A1 * | 9/2005 | Yeckley | 264/659 |
| 2006/0178256 A1 | 8/2006 | Yeckley | |

OTHER PUBLICATIONS

Evans and Charles, Fracture Toughness Determination by Indentation, J. Am. Ceramic Soc. vol. 59 Nos. 7-8 pp. 371-372.

Z. Mencik et al., "Quantitative Phase Analysis of SyntheticSilicon Nitride by X-Ray Diffraction", Advances in X-ray Analysis, vol. 23, 1979 pp. 375-379.

* cited by examiner

*Primary Examiner*—Karl E Group
(74) *Attorney, Agent, or Firm*—Matthew W. Smith

(57) ABSTRACT

A SiAlON ceramic armor made from a starting powder mixture. The ceramic armor contains between about 60 weight percent and about 98 weight percent alpha SiAlON phase that contains an alpha SiAlON-bound rare earth element and between about 2 weight percent and about 40 weight percent of a beta SiAlON phase of the formula $Si_{6-z}Al_zO_zN_{8-z}$ wherein the value of "z" ranges between about 0.2 and about 1.0. The ceramic armor further comprising sintering aid residue present as a result of the starting powder mixture containing between about 4 weight percent and about 14 weight percent of an oxide of an alpha SiAlON-bound rare earth element. The ceramic armor has a fracture toughness ($K_{IC}$) greater than about 6.00 M·Pa $m^{1/2}$ and a Vickers hardness ($H_{VN}$) equal to greater than about 17.5 GPa.

26 Claims, 7 Drawing Sheets

30 μm

100 μm

ALPHA-BETA SIALON BALLISTIC CERAMIC ARMOR

GOVERNMENT RIGHTS

The United States Government has rights in this invention pursuant to Army Contract No. W911NF-04-2-0037 between the United States Department of the Army and Kennametal Inc.

BACKGROUND OF THE INVENTION

The present invention relates to ballistic ceramic armor. More specifically, the present invention pertains to ballistic ceramic armor made from an alpha-beta SiAlON ceramic material that exhibits excellent ballistic performance results, as well as provides other advantages over earlier ceramic armor materials. An alpha-beta SiAlON ceramic material is a ceramic that contains an alpha SiAlON phase (which can also be referred to as an alpha-prime SiAlON phase or an $\alpha$-SiAlON phase or an $\alpha'$—SiAlON phase) and a beta SiAlON phase (which can also be referred to as an beta-prime SiAlON phase or an $\beta$-SiAlON phase or an $\beta$-SiAlON phase), as well as optional intergranular phases such as a glassy phase (which is typically amorphous) and/or a crystalline phase.

Ballistic ceramic armor is intended to be worn by a user for protection, as well as for use in protecting light mobile equipment and vehicles, against high-speed firearm projectiles (e.g., bullets) and fragments (e.g., shrapnel). There are three main considerations concerning protective ballistic armor materials.

The first consideration for protective ballistic armor is the weight of the armor. Protective armor for heavy, but mobile, military equipment (e.g., tanks and large ships), is known. Such armor usually comprises a thick layer of alloy steel, which is intended to provide protection against heavy and explosive projectiles. Because of the large size of this equipment, the greater weight of the alloy steel kinds of armor is not a significant consideration for equipment such as tanks and ships. However, due to its greater weight, such armor is quite unsuitable for light vehicles such as automobiles, jeeps, light boats, or aircraft, whose performance is compromised by armor that is of a greater weight. The same is true for body armor designed to be worn by a user in that heavy body armor is undesirable and impractical.

While specifications for body armor and armor for light vehicles may vary upon the specific application, armor suitable for these kinds of applications must prevent penetration of bullets of any weight at high speeds (e.g., speeds in the range of 700 to 3000 meters per second). Further, armor suitable for these kinds of applications must satisfy certain weight limitations (e.g., an armor weight which is acceptable for use on light vehicles varies with the type of vehicle, but generally falls in the range of 40 to 70 kg/m$^2$).

It can thus be appreciated that it would highly desirable to provide a ballistic armor, and especially a ballistic ceramic armor, that is able to satisfactorily prevent penetration of projectiles even when traveling at high speeds. It can also be appreciated that it would be highly desirable to provide such a ballistic ceramic armor that is sufficiently lightweight so as to not impede the performance of light vehicles or individuals in the case of ballistic ceramic body armor.

The cost of the material is a second consideration concerning protective ballistic armor materials. In the case of overly complex armor arrangements, particularly those arrangements depending entirely on synthetic fibers, it has been found that the armor arrangement comprises a notable portion of the total vehicle cost. In such a situation, the result can be that manufacture of the vehicle is not profitable due to the cost of the ballistic armor component. It can therefore also be appreciated that it would be highly desirable to provide a ballistic armor, and especially a ballistic ceramic armor, that is affordable to make wherein the affordability of the armor results from one or both of the cost of materials and the cost of manufacture of the ballistic ceramic armor.

A third consideration in armor design is compactness of the ballistic armor bodies or components. A thick armor panel, including air spaces between its various layers, increases the target profile of the vehicle, as well as increases the wind resistance of the vehicle. As can be appreciated, each one of these results is undesirable in that it makes the vehicle more susceptible to compromise to attack by an enemy. In the case of vehicles retrofitted with internal ballistic armor (e.g., civilian automobiles or even military vehicles needing more armor protection), there oftentimes is a lack of apace to affix a thick panel to those areas that require protection. It can thus be appreciated that it would be highly desirable to provide a ballistic armor, and especially a ballistic ceramic armor, that presents a compact design so as to take up less space than heretofore thicker armor panels, and thus, be suitable to retrofit existing vehicles.

Heretofore, ceramic materials have been considered as potential candidates for use as ballistic armor. Silicon carbide and boron carbide are two especially suitable ceramic material candidates for ballistic ceramic armor. Exemplary patent documents that describe these kinds of ballistic ceramic armor materials, as well as other kinds of ceramic armor materials, include the following: U.S. Pat. No. 6,805,034 B1 to McCormick et al. for Silicon Carbide Armor Bodies, and Methods for Making Same, U.S. Pat. No. 7,104,177 B1 to Ahajanian et al. for Ceramic-Rich Composite Armor, and Methods for Making Same, and U.S. Pat. No. 7,117,780 to Cohen for a Composite Armor Plate.

Although current ballistic ceramic armor materials may provide satisfactory performance results, there remains a need to provide an improved ballistic ceramic armor whereby such armor addresses the above-mentioned design considerations for ballistic armor. In this regard, the improved ballistic ceramic would be able to satisfactorily prevent penetration of projectiles even when traveling at high speeds, as well as be sufficiently lightweight so as to not impede the performance of light vehicles or individuals in the case of ballistic ceramic body armor.

Further, such improved ballistic ceramic armor would be affordable to make wherein the affordability of the armor results from one or both of the cost of materials and the cost of manufacture of the ballistic ceramic armor. In reference to the method of manufacturing, such improved ballistic ceramic armor would provide the capability to be made into more complex shapes or geometries than heretofore available. This would be due to the ability to make the ceramic by methods (e.g., sinter-HIP techniques) that allow for more flexibility than earlier methods (e.g., hot pressing techniques).

In addition, such improved ballistic ceramic armor would present a compact design so as to take up less space than heretofore thicker armor panels, and thus, be suitable to retrofit existing vehicles. The capability to make ballistic ceramic armor of more complex shapes facilitates activities like the retrofitting of existing vehicles.

SUMMARY OF THE INVENTION

In one form thereof, the invention is a SiAlON ceramic armor made from a starting powder mixture. The ceramic armor comprises a ceramic body that comprises between about 60 weight percent and about 98 weight percent alpha SiAlON phase that contains an alpha SiAlON-bound rare earth element and between about 2 weight percent and about 40 weight percent of a beta SiAlON phase of the formula $Si_{6-z}Al_zO_zN_{8-z}$ wherein the value of "z" ranges between about 0.2 and about 1.0. The ceramic body further comprises sintering aid residue present as a result of the starting powder mixture containing between about 4 weight percent and about 14 weight percent of an oxide of an alpha SiAlON-bound rare earth element. The ceramic body has a fracture toughness ($K_{IC}$) greater than about 6.00 M·Pa m$^{1/2}$ and a Vickers hardness ($H_{VN}$) equal to greater than about 17.5 GPa.

In another form thereof, the invention is a SiAlON ceramic armor that comprises a ceramic body that comprises an alpha SiAlON phase and a beta SiAlON phase of the formula $Si_{6-z}Al_zO_zN_{8-z}$ wherein the value of "z" ranges between about 0.2 and about 1.0. The ceramic body is made from a starting powder mixture comprising between about 65 weight percent and about 85 weight percent silicon nitride, between about 5 weight percent and about 15 weight percent aluminum nitride, between about 0.25 weight percent and about 9 weight percent alumina, between about 4 weight percent and about 14 weight percent of an oxide of an alpha SiAlON-bound rare earth element. The ceramic body has a fracture toughness ($K_{IC}$) greater than about 6.00 M·Pa m$^{1/2}$ and a Vickers hardness ($H_{VN}$) equal to greater than about 17.5 GPa.

In yet another form thereof, the invention is a SiAlON ceramic armor made from a starting powder mixture. The ceramic armor comprises a ceramic body that comprises between about 85 weight percent and about 98 weight percent alpha SiAlON phase that contains an alpha SiAlON-bound rare earth element, and between about 2 weight percent and about 6 weight percent beta SiAlON phase of the formula $Si_{6-z}Al_zO_zN_{8-z}$ wherein the value of "z" ranges between about 0.2 and about 1.0, and between about 1 weight percent and about 30 weight percent silicon carbide. The ceramic body further comprises sintering aid residue present as a result of the starting powder mixture containing between about 4 weight percent and about 14 weight percent of an oxide of an alpha SiAlON-bound rare earth element. The ceramic body has a fracture toughness ($K_{IC}$) greater than about 6.00 M·Pa m$^{1/2}$ and a Vickers hardness ($H_{VN}$) equal to greater than about 17.5 GPa.

In still another form thereof, the invention is a SiAlON ceramic armor that comprises a ceramic body that comprises an alpha SiAlON phase and a beta SiAlON phase of the formula $Si_{6-z}Al_zO_zN_{8-z}$ wherein the value of "z" ranges between about 0.2 and about 1.0. The ceramic body is made from a starting powder mixture comprising between about 65 weight percent and about 85 weight percent silicon nitride, between about 5 weight percent and about 15 weight percent aluminum nitride, between about 0.25 weight percent and about 9 weight percent alumina, between about 4 weight percent and about 14 weight percent of an oxide of an alpha SiAlON-bound rare earth element, and between about 1 weight percent and about 30 weight percent silicon carbide. The ceramic body has a fracture toughness ($K_{IC}$) greater than about 6.00 M·Pa m$^{1/2}$ and a Vickers hardness ($H_{VN}$) equal to greater than about 17.5 GPa.

In another form thereof, the invention is a method of making a SiAlON ceramic armor comprising the steps of: providing a starting powder mixture comprising between about 65 weight percent and about 85 weight percent silicon nitride, between about 5 weight percent and about 15 weight percent aluminum nitride, between about 0.25 weight percent and about 9 weight percent alumina, between about 4 weight percent and about 14 weight percent of an oxide of an alpha SiAlON-bound rare earth element; and pressing the starting powder mixture into a green compact; and consolidating the green compact into a consolidated ceramic body comprising an alpha SiAlON phase and a beta SiAlON phase of the formula $Si_{6-z}Al_zO_zN_{8-z}$ wherein the value of "z" ranges between about 0.2 and about 1.0, and wherein the ceramic body having a fracture toughness ($K_{IC}$) greater than about 6.00 M·Pa m$^{1/2}$ and a Vickers hardness ($H_{VN}$) equal to greater than about 17.5 GPa.

In another form thereof, the invention is a method of making a SiAlON ceramic armor comprising the steps of: providing a starting powder mixture comprising between about 65 weight percent and about 85 weight percent silicon nitride, between about 5 weight percent and about 15 weight percent aluminum nitride, between about 0.25 weight percent and about 9 weight percent alumina, between about 4 weight percent and about 14 weight percent of an oxide of an alpha SiAlON-bound rare earth element; and between about 1 weight percent and about 30 weight percent silicon carbide; and pressing the starting powder mixture into a green compact; and consolidating the green compact into a consolidated ceramic body comprising an alpha SiAlON phase and a beta SiAlON phase of the formula $Si_{6-z}Al_zO_zN_{8-z}$ wherein the value of "z" ranges between about 0.2 and about 1.0, and wherein the ceramic body having a fracture toughness ($K_{IC}$) greater than about 6.00 MPa·m$^{1/2}$ and a Vickers hardness ($H_{VN}$) equal to greater than about 17.5 GPa.

In still another form thereof, the invention is a SiAlON ceramic armor made from a starting powder mixture. The ceramic armor comprises a ceramic body that comprises between about 60 weight percent and about 98 weight percent alpha SiAlON phase that contains an alpha SiAlON-bound rare earth element and between about 2 weight percent and about 40 weight percent of a beta SiAlON phase of the formula $Si_{6-z}Al_zO_zN_{8-z}$ wherein the value of "z" ranges between about 0.2 and about 1.0. The ceramic body has a fracture toughness ($K_{IC}$) greater than about 6.00 MPa·m$^{1/2}$ and a Vickers hardness ($H_{VN}$) equal to greater than about 17.5 GPa.

In yet another form thereof, the invention is a SiAlON ceramic armor produced by the process comprising the steps of: providing a starting powder mixture comprising between about 70 weight percent and about 85 weight percent silicon nitride, between about 5 weight percent and about 12 weight percent aluminum nitride, between about 1 weight percent and about 7 weight percent alumina, between about 4 weight percent and about 14 weight percent of an oxide of an alpha SiAlON-bound rare earth element; and pressing the starting powder mixture into a green compact; and consolidating the green compact into a consolidated ceramic body comprising an alpha SiAlON phase and a beta SiAlON phase of the formula $Si_{6-z}Al_zO_zN_{8-z}$ wherein the value of "z" ranges between about 0.2 and about 1.0, and wherein the ceramic body having a fracture toughness ($K_{IC}$) greater than about 6.00 MPa·m$^{1/2}$ and a Vickers hardness ($H_{VN}$) equal to greater than about 17.5 GPa.

BRIEF DESCRIPTION OF THE DRAWINGS

The following is a brief description of the drawings that form a part of this patent application.

DETAILED DESCRIPTION

Figure 1:
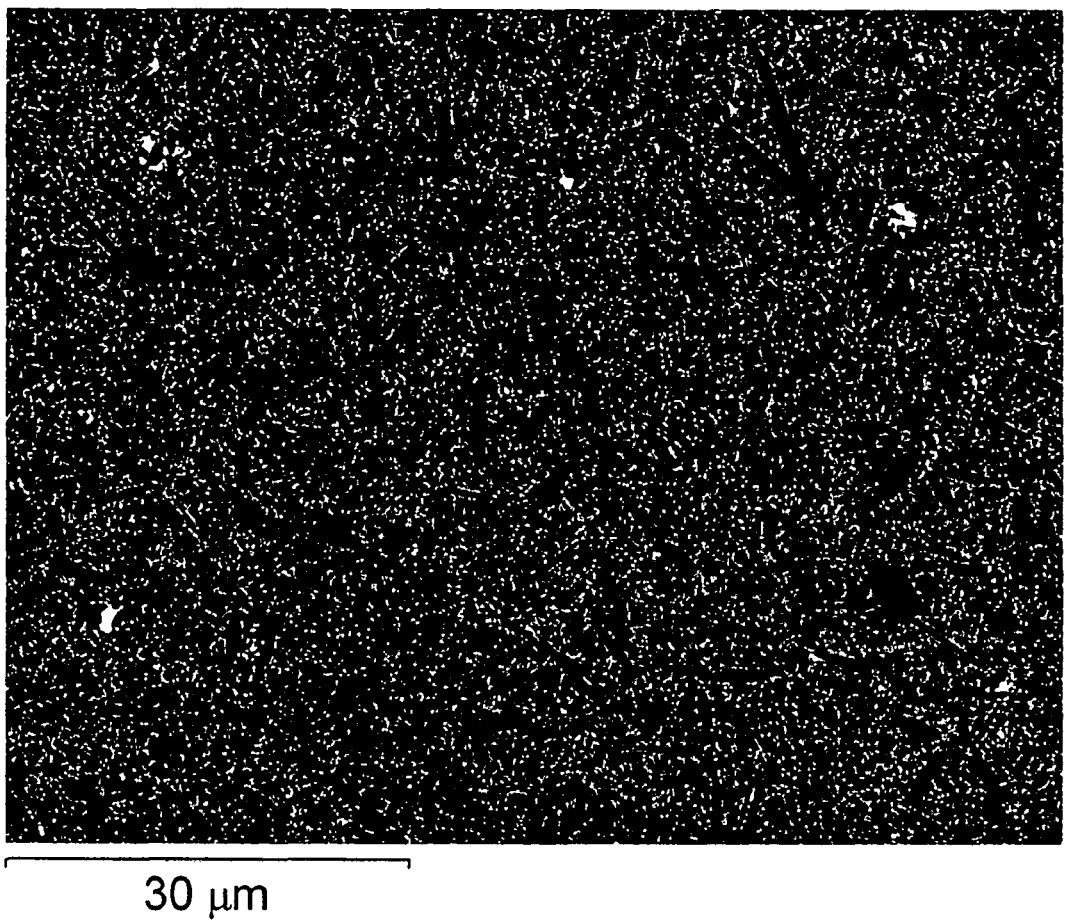
FIG. 1 is a photomicrograph that is a backscatter image taken via scanning electron microscopy (with a scale of 30 micrometers) of the ceramic Batch No. 2833A wherein the white phase is the rare earth alumina silicate grain boundary phase, the medium gray phase are grains of the alpha SiAlON phase, and dark regions comprise the beta SiAlON phase.

The present invention is a ballistic ceramic armor that satisfies the criteria for ballistic armor materials, as well as addresses drawbacks that exist with current ballistic ceramic armor materials. The present ballistic ceramic armor is able to satisfactorily prevent penetration of projectiles even when traveling at high speeds, as well as is sufficiently lightweight so as to not impede the performance of light vehicles or individuals in the case of ballistic ceramic body armor. The present ballistic ceramic armor is also affordable to make wherein the affordability of the armor results from one or both of the cost of materials and the cost of manufacture of the ballistic ceramic armor. In this regard, the present ballistic ceramic armor provides the capability to be made into more complex shapes or geometries than heretofore available. This would be due to the ability to make the ceramic by methods (e.g., sinter-HIP techniques) that allow for more flexibility than earlier methods (e.g., hot pressing techniques). The present ballistic ceramic armor also presents a compact design so as to take up less space than heretofore thicker armor panels, and thus, be suitable to retrofit existing vehicles.

The present invention is a ballistic ceramic armor made from a alpha-beta SiAlON ceramic material that typically may include intergranular phases such as, for example, a glassy phase and/or a crystalline phase. In this regard, an alpha-beta SiAlON ceramic that contains ytterbium and lanthanum and is used for cutting tool applications is described in pending U.S. patent application Ser. No. 11/054,004 filed Feb. 9, 2005 for a SiAlON Ceramic and Method of Making the Same to Yeckley. This patent application is the subject of U.S. Published Patent Application No. US 2006/0178256 A1 (published on Aug. 10, 2006), which is assigned to the assignee (Kennametal Inc. of Latrobe, Pa.) of the present patent application, which is incorporated by reference herein.

In regard to the alpha-SiAlON phase of the alpha-beta SiAlON ceramic, the alpha prime SiAlON phase may be of the formula $M_xSi_{12-(m+n)}Al_{m+n}O_nN_{16-n}$ where M is a rare earth element such as, for example ytterbium (Yb). Other rare earth elements suitable for use as the "M" element (i.e., the alpha SiAlON-bound rare earth element) include Y, Pr, Nd, Pm, Sm, Eu, Gd, Tb, Dy, Ho, Er, Tm, and Lu. Since the element "M" is a part of the alpha SiAON phase, one can consider this element to be an alpha SiAlON-bound rare earth element. The alpha prime SiAlON phase comprises generally equi-axed grains.

In regard to the beta SiAlON phase, this phase may be of the formula $Si_{b-z}Al_zO_zN_{8-z}$ where $0<z\leq 4.2$. In ballistic armor applications, applicant contemplates that the value of "z" would range between about 0.2 and about 1.0. The beta prime SiAlON phase comprises generally elongated grains. Although it will be described in more detail hereinafter, it is very much preferred that the starting powder mixture includes silicon nitride starting powder that contains either no or a low amount of (i.e., an amount that has a lower limit equal to zero weight percent and an upper limit equal to about 1.6 weight percent and in the alternative, an amount that has a lower limit equal to zero weight percent and an upper limit equal to about 3 weight percent) beta silicon nitride. It is most preferred to use a silicon nitride starting powder that contains essentially zero weight percent beta silicon nitride.

The alpha-beta SiAlON ceramic material as discussed herein also contains one or more additional phases including an intergranular phase. The intergranular phase may comprise a glassy phase and an intergranular crystalline phase may sometimes also be present. The glassy phase is typically an amorphous phase that contains the rare earth elements, silicon, oxygen, aluminum and nitrogen. When the alpha SiAlON-bound rare earth additive is ytterbium, the intergranular crystalline phases that may be present are: YbAG (ytterbium aluminum garnet) which is a cubic phase of the formula $Yb_3Al_5O_{12}$), and J-phase which has the formula $Yb_4Si_{2-x}Al_xO_{7+x}N_{2-x}$ wherein x ranges from 0 to 2, and $(Yb_4Si_{0.67}Al_{1.3})_{8.33}N_{0.67}$.

For ballistic ceramic armor applications, it would be very desirable for the ceramic material to exhibit the optimum combination of high hardness and high fracture toughness. Typically, a SiAlON ceramic material that has a finer grain size results in a higher hardness. Thus, it would be desirable to provide a SiAlON ceramic material that has a finer grain size, and hence, a higher hardness.

It is known that during the sintering of a powder mixture to make a SiAlON material, crystalline phases can form in the grain boundaries between the alpha prime SiAlON grains and the beta prime SiAlON grains. An increase in the content of crystalline phases in the grain boundaries can result in a reduction of the fracture toughness of the SiAlON material. Hence, it would be desirable (or at least preferable) to provide a SiAlON material that has a minimal amount of the crystalline phase(s) that have formed in the grain boundaries. The temperature at which the additives form a liquid phase can impact upon the densification of the SiAlON body. In order to improve the densification of the SiAlON body, it would be advantageous to use additives that form a liquid phase at a relatively lower temperature.

Along this same line, it would be an option, and generally speaking a preferable although not mandatory option, in regard to the formation of the alpha prime SiAlON phase (alpha SiAlON phase) to use additive(s) that would form and maintain an intergranular liquid phase upon sintering and throughout the sintering cycle (i.e., a non-binding liquid phase-forming additive or an unbound rare earth element). In this situation, essentially none of the non-binding liquid phase-forming additives would become a part of the alpha prime SiAlON phase, i.e., there would be essentially no detectable amount of the non-binding liquid phase-forming additive (the unbound rare earth element) in the alpha prime SiAlON phase. More specifically, what this means is that in the case where the grains of the alpha prime SiAlON phase are sufficiently large (i.e., on the order of greater than or equal to about 2 micrometers in diameter) one does not detect the presence of such non-binding liquid phase-forming additives in the grains of the alpha prime SiAlON phase through the use of energy dispersive spectrum-scanning electron microscopy (EDS/SEM) techniques.

The result of the absence of any detectable amount of non-binding liquid phase-forming additive in the alpha prime SiAlON phase would be that the liquid phase would be maintained through the sintering cycle. By maintaining the liquid phase during the sintering cycle, the amount of alpha prime SiAlON phase that would be formed increases. Applicant believes that it would be desirable to provide a SiAlON ceramic body that has an increased content of alpha prime SiAlON phase.

In one embodiment of the present SiAlON ceramic, the starting powder mixture includes a non-binding liquid phase-forming additive that does not enter the alpha-SiAlON structure during sintering (which can be a selected rare earth element (e.g., lanthanum or cerium)) along with at least one rare earth element (e.g., ytterbium) that will enter the alpha-SiAlON structure. Upon sintering the powder mixture, the non-binding liquid phase-forming additive, as well as the one rare earth additive, each forms a liquid phase.

During the sintering process, essentially no effective portion (i.e., essentially no detectable amount) of the non-binding liquid phase-forming additive (unbound rare earth element) forms a part of the alpha prime SiAlON phase (or the beta prime SiAlON phase) so that the liquid phase is maintained throughout the sintering process. More specifically, as shown by its formula, the beta prime SiAlON phase does not contain any non-binding liquid phase-forming additive(s). In regard to the alpha prime SiAlON phase, essentially no detectable amount of the non-binding liquid phase-forming additive(s) is present in the alpha prime SiAlON phase which means that an analysis of grains of the alpha prime SiAlON phase that have a diameter greater than or equal to about 2 micrometers using an EDS/SEM technique does not detect the presence of any of the non-binding liquid phase-forming additive(s).

The presence of the liquid phase enhances (i.e., increases) the formation of the alpha prime SiAlON phase wherein the alpha prime SiAlON phase includes the one rare earth element therein, i.e., the rare earth that has entered the alpha-SiAlON structure (i.e., the alpha SiAlON-bound rare earth element). These additives can comprise a number of compounds or elements (including selected rare earth elements) as described hereinafter. The specific rare earth elements that comprise a part of the alpha prime SiAlON phase are also discussed hereinafter.

Described below are some examples of the present invention. The examples discussed below comprise a SiAlON ceramic material that contains ytterbium and lanthanum wherein this means that the starting powder mixture for the specific examples set forth in Table 4 contain one oxide of an alpha SiAlON-bound rare earth element and one oxide of an unbound rare earth element. Even though these examples contain ytterbium and lanthanum, applicant does not intend to limit the scope of the invention by the composition of these examples. In this regard, applicant contemplates that the starting powder mixture may contain only one oxide of an alpha SiAlON-bound rare earth element or, in an alternative, an oxide of one alpha SiAlON-bound rare earth element and an oxide of another alpha SiAlON-bound rare earth element.

Further, applicant contemplates that the starting powder mixture may contain two rare earth elements wherein these rare earth elements are selected according to the following parameters. The selected rare earth elements (RE in the alpha SiAlON formula set forth below) are selected from at least two groups of the following three groups of rare earth elements wherein Group I comprises La, Ce, Pr, Nd, Pm, Sm and Eu, and Group II comprises Gd, Tb, Dy and Ho, and Group III comprises Er, Tm, Yb and Lu. The alpha prime SiAlON phase has the formula $(RE)_x Si_{12-(m+n)} Al_{m+n} O_n N_{16-n}$ wherein RE is the contribution of at least one of the selected rare earth elements as discussed hereinabove excluding La and Ce. In this aspect of the invention, applicant prefers that one of the rare earth elements (e.g., lanthanum or cerium, which can be considered to be a non-binding liquid phase-forming rare earth element (or an unbound rare earth element)) forms a liquid phase during and through the sintering process. The liquid phase-forming rare earth element does not form a part of the alpha prime SiAlON phase so that there is essentially no detectable amount of the non-binding liquid phase-forming rare earth element (unbound rare earth element) in the alpha prime SiAlON phase. Through an x-ray diffraction technique, the value of x in the alpha prime SiAlON phase is equal to between a lower limit equal to about 0.10 and an upper limit equal to about 0.45. The value of m equals three times the value of x. The alpha prime SiAlON phase comprises generally equi-axed grains. Even though the above discussion mentions two rare earth elements, it should be appreciated that three of more rare earth elements may be-included in the starting powder mixture to produce the SiAlON ceramic body.

One advantageous feature in the production of an alpha prime-beta prime SiAlON ceramic body is the ability to control (or at least exercise some control) over the composition and crystalline phase content of the resultant ceramic body. For example, applicant believes that the content of alpha prime SiAlON phase in the ceramic has an impact upon the properties of the ceramic, and especially those properties that allow the ceramic to function very well as a ballistic ceramic armor material.

Set forth below is applicant's understanding of why the alpha prime SiAlON content of such a SiAlON ceramic body can be controlled (at least to some extent). However, applicant does not intend to be restricted by or bound to the following discussion about applicant's understanding.

Applicant also believes that other additives that form a silicate liquid phase upon and through sintering, but do not form a part of the alpha prime SiAlON phase (i.e., non-binding additives), should also provide an advantageous result along the lines of the results provided by the lanthanum addition. In this regard, exemplary non-binding additives comprise BaO, MgO, SrO and $Sc_2O_3$ (these non-binding additives are good densification additives and they do not enter into the alpha-SiAlON phase) wherein these additives are added in amounts that range from a lower limit that equals about 0.1 weight percent of the starting powder mixture to an upper limit that equals about 1.0 weight percent of the starting powder mixture. In this aspect of the invention, the starting powder mixture includes an additive that forms a silicate liquid phase upon sintering wherein the additive does not form a part of the alpha prime SiAlON phase, i.e., a non-binding liquid phase-forming additive. The continued presence of the liquid phase enhances the formation of the alpha prime SiAlON phase so as to result in a SiAlON ceramic that has an increased content of the alpha prime SiAlON phase.

Although applicant does not intend to be restricted by the following theory thought to be at work in this invention, applicant believes that the advantages are obtained through the above selection parameters because the two or more rare earth elements will not form a solid solution. The ionic radii of the elements decrease across the series of rare earth elements, and as the difference between the ionic radius of the rare earth elements becomes greater these elements have an increased tendency to not enter the same crystalline structure. What this means is that during densification and cooling from the sintering temperature, the crystallizations rates are slowed down because the rare earth elements are attempting to crystallize in the intergranular regions.

Applicant also believes that the improved properties are enhanced by the fact that the SiAlON ceramic material is made from a starting powder mixture that includes silicon nitride starting powder that contains either no or a low amount of (i.e., an amount that has a lower limit equal to zero weight percent and an upper limit equal to about 1.6 weight percent or in the alternative, an upper limit equal to about 3 weight percent) beta silicon nitride. In this regard, while applicant does not intend to be restricted by any particular theory, applicant believes that the beta silicon nitride particles are seeds for the nucleation and growth of the beta prime SiAlON grains. As the number of the beta silicon nitride particles increase the beta prime SiAlON grains impinge each other sooner so as to limit the formation of high aspect ratio beta prime SiAlON grains. In addition, as the number of the beta silicon nitride particles increases the content of the alpha prime SiAlON grains decreases. The use of fewer beta silicon nitride particles in the starting powder mixture results in a limited number of nucleation sites for the beta prime SiAlON grains to grow into the alpha prime SiAlON matrix during sintering. This results in beta prime SiAlON grains with a higher aspect ratio which causes a toughening of the alpha prima SiAlON phase matrix. This explanation is also found in U.S. Pat. No. 6,693,054 to Yeckley that is assigned to the assignee of the present patent application.

As described below, the starting silicon nitride powder for these examples does not contain any beta silicon nitride. However, the fact that the examples use a silicon nitride starting powder that does not contain any beta nitride is not intended to restrict the scope of the invention. As set forth herein, the beta-silicon nitride content of the silicon nitride powder can have a lower limit equal to zero weight percent and an upper limit equal to about 1.6 weight percent of the silicon nitride powder, and in the alternative, a lower limit equal to zero weight percent and an upper limit equal to about 3 weight percent of the silicon nitride powder.

TABLE 1

Starting Powder Mixtures (in weight percent of the total starting powder mixture) of the Batches of the Inventive SiAlON Ceramic

| Batch No. | Silicon Nitride | Aluminum Nitride | Alumina | Ytterbia | Lathina | Silicon Carbide |
|---|---|---|---|---|---|---|
| 2833A | 83.65 | 5.95 | 1.49 | 8.14 | 0.77 | — |
| 2833B | 76.21 | 9.82 | 3.27 | 9.92 | 0.77 | — |
| 2833C | 77.60 | 9.33 | 4.17 | 8.14 | 0.77 | — |
| 2833D | 70.45 | 11.91 | 6.95 | 9.92 | 0.77 | — |
| 2963A | 76.21 | 9.82 | 3.27 | 9.92 | 0.77 | 5.00 |
| 2963B | 76.21 | 9.82 | 3.27 | 9.92 | 0.77 | 10.00 |
| 2963C | 76.21 | 9.82 | 3.27 | 9.92 | 0.77 | 15.00 |
| 3141A | 75.83 | 10.02 | 3.07 | 9.92 | 0.77 | 7.50 |
| 3241A | 83.65 | 6.15 | 1.29 | 8.14 | 0.77 | — |
| 3242A | 81.99 | 6.47 | 1.09 | 9.95 | 0.50 | — |
| 3242B | 81.40 | 7.16 | 1.00 | 9.95 | 0.50 | — |

TABLE 2

Particle Size Properties for the Ball Milled Starting Powder Mixtures (in weight percent) of Selected Batches of the Inventive SiAlON Ceramic

| Batch No. | BET | O2 | PSD 0.1 | PSD 0.5 | PSD 0.9 |
|---|---|---|---|---|---|
| 2833A | 4.64 | 2.64 | 0.45 | 0.85 | 1.44 |
| 2833B | 4.63 | 3.84 | 0.44 | 0.85 | 1.56 |
| 2833C | 4.50 | 3.88 | 0.45 | 0.86 | 1.56 |
| 2833D | 4.63 | 5.60 | 0.44 | 0.86 | 1.57 |
| 2963A | 3.28 | 3.57 | 0.45 | 0.98 | 1.83 |
| 2963B | 4.23 | 3.62 | 0.44 | 1.22 | 2.79 |
| 2963C | 4.38 | 3.36 | 0.42 | 1.00 | 1.95 |
| 3141A | 5.05 | 3.73 | 0.36 | 0.80 | 1.62 |
| 3241A | 5.03 | 2.93 | 0.43 | 0.80 | 1.45 |
| 3242A | 4.95 | 3.01 | 0.43 | 0.80 | 1.44 |
| 3242B | 5.06 | 3.10 | 0.42 | 0.78 | 1.40 |

TABLE 2A

Particle Size Properties for the Ball Milled Starting Powder Mixtures (in weight percent) of the Batch Nos. 2963A-2963C of the Inventive SiAlON Ceramic Prior to the addition of the SiC Particles

| Batch No. | BET | O2 | PSD 0.1 | PSD 0.5 | PSD 0.9 |
|---|---|---|---|---|---|
| 2963A | 3.28 | 3.57 | 0.45 | 0.98 | 1.83 |
| 2963B | 4.23 | 3.62 | 0.44 | 1.22 | 2.79 |
| 2963C | 4.38 | 3.36 | 0.42 | 1.00 | 1.95 |

For Table 2 and Table 2A, the data set forth therein comprises the following properties: (a) the average surface area of the particles was measured by the BET (Brunauer, Emmet and Teller) method and reported in square meters per gram ($m^2$/gm); (b) the oxygen content of the particles is reported in weight percent of the particle mixture, and is measured via a Leco Oxygen Analyzer; (c) the particle size distribution (i.e., PSD 0.1, PSD 0.5 and PSD 0.9) is reported in microns. It should be appreciated that the particle size data set forth in Table 2A refers to the ball milled components, except for the silicon carbide particles. For these batches, the silicon carbide particles were added after the other powder components had been ball milled for thirteen hours. Thus, the particle size data set out in Table 2A reflects the size of the components (except for silicon carbide) after thirteen hours of ball milling.

The starting powders are briefly described as follows. The silicon nitride powders was made by UBE Industries, Inc. and sold under the designation SNE03. This silicon nitride powder did not contain any beta silicon nitride, but instead, comprised about one hundred percent alpha silicon nitride, except for impurities. Even though the starting silicon nitride powder for the specific examples contains about one hundred percent alpha silicon nitride (except for impurities), applicant contemplates that the starting silicon nitride powder may contain as one alternative up to about 1.6 weight percent beta silicon nitride, and as another alternative, up to about 3 weight percent beta silicon nitride. The aluminum nitride starting powder was supplied by Herman C. Starck of New York, N.Y. (United States of America) under the designation Grade A. The aluminum oxide starting powder was supplied by Sasol North America, Inc., Ceralox Division of Tucson, Ariz. (United States of America) under the designation HPA-0.5 (which contains a deliberate addition of 0.5 weight percent magnesia). The ytterbium oxide starting powder and the lanthanum oxide starting powder were supplied by Molycorp Corporation of Mountain Pass, Calif. (United States of America).

For each one of Batch Nos. 2833A-2833D set out in Table 1, the starting composition was milled for a time of between about 8 hours and about 16 hours with isopropanol and using an alpha' SiAlON-beta' SiAlON media to form a slurry. After completion of the milling, the slurry was discharged through a 400 mesh screen and then vacuum dried to form a dry powder. The dry powder was then fitzmilled and pellitized using a fluid bed process. Rosin and Carbowax 400 were added as binders during the fluidization process. The pellitized material (dry powder and the binder material) was then dry pressed into green compacts of partial density wherein this density ranged between about 2 to about 2.15 grams per cubic centimeter. The binder was then removed by an air burnout cycle that had a maximum temperature of about 875 degrees Fahrenheit.

Each one of the Batches Nos. 2833A-2833D was batch-sintered. In regard to the batch sintering, the process comprised placing compacts in a graphite box. The compacts were buried in an 80 weight percent silicon nitride-20 weight percent boron nitride powder mixture. The compacts were sintered under one atmosphere of nitrogen for duration equal to 60 minutes at a temperature equal to 1825° C. These samples from Batches Nos. 2833A-2833D were then subjected to a hot isostatic pressing step at the following parameters: 1800° C. for 30 minutes at a pressure equal to 20,000 psi wherein 150 psi is due to nitrogen and the balance is due to argon.

For each one of Batch Nos. 2963A-2963C, the starting composition (except for the silicon carbide particles) was milled for a time of about 13 hours with isopropanol and using an alpha' SiAlON-beta' SiAlON media to form an initial slurry. The silicon carbide particles (an average particle size equal to between 5 to 8 microns) were then added to the initial slurry, and this mixture was ball milled for another three hours. After completion of the milling, the final slurry was discharged through a 400 mesh screen and then vacuum dried to form a dry powder. The dry powder was then fitzmilled and pellitized using a fluid bed process. Rosin and Carbowax 400 were added as binders during the fluidization process. The pellitized material (dry powder and the binder material) was then dry pressed into green compacts of partial density wherein this density ranged between about 2 to about 2.15 grams per cubic centimeter. The binder was then removed by an air burnout cycle that had a maximum temperature of about 600 degrees Centigrade.

Samples from Batches No. 2833A-2833D were sintered via the E749 sintering cycle that comprises placing compacts in a graphite box wherein the compacts were buried in an 80 weight percent silicon nitride-20 weight percent boron nitride powder mixture. The compacts were sintered under one atmosphere of nitrogen for duration equal to 60 minutes at a temperature equal to 1825° C. These samples from Batches Nos. 2963A-2963C were then subjected to a hot isostatic pressing step at the following parameters: 1800° C. for 30 minutes at a pressure equal to 20,000 psi wherein 150 psi is due to nitrogen and the balance is due to argon.

Some samples from Batches Nos. 2963A-2963C were sintered per the PS124 sintering cycle wherein these green compacts from Batches Nos. 2963A-2963C were then pressure sintered by being buried in a 50 weight percent boron nitride-50 weight percent silicon nitride setting powder containing about 0.5 weight percent alumina. During the PS124 sintering cycle, nitrogen pressure was 100 psi from 600° C. up to the sintering temperature of 1880° C. wherein the sintered compacts were subjected to a 60 minute soak at 1880° C. with a nitrogen pressure of between about 100 psi and about 200 psi, and then the pressure increased to about 1500 psi with argon gas and held for about 30 minutes.

Samples from Batches Nos. 2963A-2963C were sintered per the PS131 sintering cycle. In reference to the PS131 sintering cycle, the green compact were buried in a 50 weight percent boron nitride-50 weight percent silicon nitride setting powder containing about 0.5 weight percent alumina. During the sintering cycle, when at the temperature equal to 600° C. nitrogen, was introduced at a pressure equal to 20 psi. The nitrogen pressure was maintained between about 20 psi and about 40 psi up to the temperature of 1850° C. At a temperature equal to 1880° C., the nitrogen pressure was raised to 100 psi and the sintered compacts were subjected to a 60 minute soak at 1880° C. with a nitrogen pressure of between about 100 psi and about 200 psi, and then the pressure increased to about 1500 psi with argon gas and held for about 30 minutes.

Samples from Batches Nos. 2963A-2963C were sintered per the PS135 sintering cycle. The PS135 sintering cycle was the same as the PS131 cycle, except that the pressed green compacts were subjected to a vacuum delube rather than an air burnout.

TABLE 3

Weight Change and Density Data for Batch Nos. 2963A-2963C Subjected to Sintering Cycles E749, PS 124, P131 and PS135

| Batch No. | Sintering Cycle | HIP Cycle | Weight Change (%) | Sintered Density (grams/cm³) | Density After HIPing (grams/cm³) |
|---|---|---|---|---|---|
| 2963A | E749 | Kz608 | +0.18% | 3.305 | 3.397 |
| 2963A | E749 | Kz608 | — | 3.308 | 3.403 |
| 2963B | E749 | Kz608 | +0.052% | 3.071 | 3.177 |
| 2963B | E749 | Kz608 | — | 3.036 | 3.243 |
| 2963C | E749 | Kz608 | +0.75% | 3.136 | 3.302 |
| 2963C | E749 | Kz608 | — | Absorb | 3.122 |
| 2963A | PS124 | — | 0.13% | 3.393 | — |
| 2963A | Ps124 | — | — | 3.391 | — |
| 2963B | PS124 | — | +0.50% | 2.858 | — |
| 2963B | PS124 | — | — | 2.83 | — |
| 2963C | PS124 | — | +0.48% | 3.007 | — |
| 2963C | PS124 | — | — | 2.793 | — |
| 2963A | P131 | — | −0.41% | 3.384 | — |
| 2963B | P131 | — | −0.13% | 3.381 | — |
| 2963C | P131 | — | −0.21% | 3.368 | — |

TABLE 3-continued

Weight Change and Density Data for Batch Nos. 2963A-2963C Subjected to Sintering Cycles E749, PS 124, P131 and PS135

| Batch No. | Sintering Cycle | HIP Cycle | Weight Change (%) | Sintered Density (grams/cm$^3$) | Density After HIPing (grams/cm$^3$) |
|---|---|---|---|---|---|
| 2963A | PS135 | — | −0.9% | 3.397 | — |
| 2963B | PS135 | — | −1.42% | Absorb | — |
| 2963C | PS135 | — | −1.14% | 3.209 | — |

For Batch No. 3141A, the starting composition was milled in a 27 gallon mill for a time of between about 8 hours and about 16 hours with isopropanol and using an alpha' SiAlON-beta' SiAlON media to form a slurry. After completion of the milling, the slurry was discharged through a 400 mesh screen. Carbowax 600 and PVP/VAI335 were blended into the milled slurry using a lightening mixer. The powder slurry with the binder was then spray dried in a Niro Mobile Minor spray dryer. The spray dried material (dry powder and the binder material) was then dry pressed into green compacts of partial density wherein this density ranged between about 2 to about 2.15 grams per cubic centimeter. The binder was then removed by an air burnout cycle that had a maximum temperature of about 875 degrees Fahrenheit.

The samples from Batch No. 3141A were subjected to the PS171 sintering cycle, which was the same as the PS131 sintering cycle.

For Batches Nos. 3241A, 3242A and 3242B, the starting composition was milled in a 27 gallon mill for a time of between about 8 hours and about 16 hours with isopropanol and using an alpha' SiAlON-beta' SiAlON media to form a slurry. After completion of the milling, the slurry was discharged through a 400 mesh screen. Carbowax 600 and PVP/VAI335 were blended into the milled slurry using a lightening mixer. The powder slurry with the binder was then spray dried in a Niro Mobile Minor spray unit. The spray dried material (dry powder and the binder material) was then dry pressed into green compacts of partial density wherein this density ranged between about 2 to about 2.15 grams per cubic centimeter. The binder was then removed by an air burnout cycle that had a maximum temperature of about 875 degrees Fahrenheit.

The samples from Batches Nos. 3241A, 3242A and 3242B were subjected to the PS211 sintering cycle, which was the same as the PS131 sintering cycle.

TABLE 4

Selected Physical Properties of Ceramic Bodies of Batches of the Inventive SiAlON Ceramic

| Batch No. | Percent alpha SiAlON phase | Percent beta SiAlON phase | RI | Vickers Hardness GPa/Std. Dev. | Fracture Toughness ($K_{IC}$) MPa·m$^{1/2}$/ Std. Dev. | $H_{kn}$ (2 kg load kg/mm$^2$)/Std. Dev. | E (GPa) | Shear (GPa) | Poisson's Ratio |
|---|---|---|---|---|---|---|---|---|---|
| 2833A | 77 | 23 | N.D. | 18.040/.29 | 7.730/.10 | 1851/29 | 333.675 | 131.5 | 0.269 |
| 2833B | 95.4 | 4.6 | N.D. | 20.620/.58 | 6.540/.08 | 1869/26 | 340.6 | 134.2 | 0.269 |
| 2833C | 84.9 | 13.1 | N.D. | 17.770/.88 | 7.250/.21 | 1838/16 | 334.1 | 131.7 | 0.269 |
| 2833D | 85.3 | 14.7 | N.D. | 18.901/.06 | 6.500/.33 | 1804/43 | 315.4 | 124 | 0.272 |
| 2963A [Sinter Cycle PS135] | 94.5 | 5.5 | N.D. | 20.38/.68 | 6.91/.33 | 1910/28 | — | — | — |
| 2963B [Sinter Cycle PS135] | 94.9 | 5.1 | N.D. | — | — | — | — | — | — |
| 2963C [Sinter Cycle PS135] | 91.3 | 8.7 | N.D. | — | — | — | — | — | — |
| 3141A [Sinter Cycle PS171] | 89.7 | 4.9 | N.D. | 20.62/0.49 | 6.80/0.36 | 1972.11/40.24 | — | — | — |
| 3241A [Sinter Cycle PS211] | 60.9 | 39.1 | N.D. | 19.29/0.54 | 7.59/0.27 | 1759/28 | — | — | — |
| 3242A [Sinter Cycle PS211] | 74.9 | 25.1 | 4.1 | 19.66/0.37 | 7.04/0.12 | 1771/42 | — | — | — |
| 3242B [Sinter Cycle PS211] | 81.2 | 18.8 | 2.9 | 20.57/0.35 | 7.16/0.24 | 1825/28 | — | — | — |

Table 4 sets forth the phases present and the physical properties for each of the examples. The column RI refers to the intergranular phase (if present) as measured by the relative intensity wherein applicant believes the intergranular phase comprises $(Yb_4Si_{0.67}Al_{1.3})_{8.33}N_{0.67}$ In the RI column, the notation "ND" means that no intergranular phase was detected in the sample. The Vickers hardness (Hvn) was measured using a 18.5 kilogram load and is set forth in gigapacals. The fracture toughness ($K_{IC}$) was measured on a polished surface employing a Palmqvist indentation technique using a 18.5 kg load on a Vickers indentor per the article by Evans and Charles, "Fracture Toughness Determination by Indentation", J. American Ceramic Society, Vol. 59, Nos. 7-8, pages 371-372 and reported in MPa·m$^{1/2}$. The Knoop hardness was measured using a 2 Kg load and reported in kg/mm$^2$. The Young's Modulus (E) was measured by ultrasonic Pulse Echo technique and reported in gigapascals (GPa). The shear modulus of the ceramic was measured by ultrasonic Pulse Echo technique and reported in GPa. Poisson's Ratio is reported in Table 4. As set forth in Table 4, the weight percent of the alpha prime SiAlON phase and the beta prime SiAlON phase is of the total of the alpha prime SiAlON phase and the beta prime SiAlON phase.

TABLE 4A

Values of "z" for the beta SiIAlON Phase of Batches No. 2833A-2833D

| Batch No. | "z" value for beta SiAlON Phase ($Si_{6-z}Al_zO_zN_{8-z}$) |
|---|---|
| 2833A | .36 |
| 2833B | .64 |
| 2833C | .72 |
| 2833D | .96 |

The phases as set forth in Table 4 above were determined as described below. The values set forth for each one of the crystalline phases, i.e., the $Yb_4SiAlO_8N$ crystalline phase and the $SiAl_5O$ crystalline phase, is the relative intensity of the peak for the particular crystalline phase as compared to the major peak, i.e., the peak for beta prime SiAlON phase.

In regard to the determination of the weight percent of alpha'-SiAlON phase, the weight percent of the alpha'-SiAlON phase is calculated pursuant to the following relationship:

Weight Percent alpha'-SiAlON=$(1.72I_{\alpha'\text{-}SiAlON} \div (1.72I_{\alpha'\text{-}SiAlON}+I_{\beta'\text{-}SiAlON}+0.23I_{Si}+0.48I_{SiC}))\times 100$ percent Similarly, the weight percent of the beta'-SiAlON phase is calculated pursuant to the following relationship:

Weight Percent beta'-SiAlON=$(I_{\beta'\text{-}SiAlON} \div (1.72I_{\alpha'\text{-}SiAlON}+I_{\beta'\text{-}SiAlON}+0.23I_{Si}+0.48I_{SiC}))\times 100$ percent For the above relationships the following exists:

$I_{\alpha'\text{-}SiAlON}$=measured x-ray diffraction of the (201) reflection of alpha'-SiAlON $I_{\beta'\text{-}SiAlON}$=measured x-ray diffraction intensity of the (200) reflection of beta'-SiAlON $I_{Si}$=measured x-ray diffraction intensity of the (111) reflection of silicon metal $I_{SiC}$=measured x-ray diffraction intensity of the (015) reflection of silicon carbide (6 h)

This method is adopted from the method described in the following article: Z. Mencik, M. A. Short, and R. C. Peters, "Quantitative Phase Analysis of Synthetic Silicon Nitride by X-ray Diffraction", Advances in X-ray Analysis, Volume 23, 1979, pages 375-379.

These diffracted x-ray intensities were measured using a Bragg-Brentano focusing optics diffractometer operated at 45 KV and 40 MA. Incident x-ray optics includes a ½ degree divergence slit and 1-degree anti-scatter slit. Receiving optics included a 0.15 mm receiving slit; a curved graphite monochromoter, and a sealed detector. Diffraction data was collected from 10 to 90 degrees 2θ in step mode and analyzed using computerized methods.

The collected diffraction data was first corrected by fitting a polynomial background function. The background corrected data was analyzed using profile-fitting techniques to determine peak positions and intensity for the stated diffracted reflections.

In regard to the determination of the relative intensity of the $Yb_4SiAlO_8N$ crystalline phase and the $SiAl_5O$ crystalline phase, the relative intensity of the $Yb_4SiAlO_8N$ crystalline phase and the $SiAl_5O$ crystalline phase is calculated from the following:

Relative Intensity of the $Yb_4SiAlO_8N$ Phase=$I_{Yb4SiAlO8N} \div I_{Highest}$ Relative Intensity of the $SiAl_5O$ Phase=$I_{SiAl5O} \div I_{Highest}$ For the above relationships, the following exists:

$I_{Yb4SiAlO8N}$=measured x-ray diffraction intensity of the (211) reflection of $Yb_4SiAlO_8N$ $I_{SiAl5O}$=measured x-ray diffraction intensity of the (201) reflection of $SiA_5O$ $I_{Highest}$=measured x-ray intensity of highest peak detected (typically beta'-SiAlON)

The diffraction setup was identical to the diffraction setup to determine the weight percent of alpha'-SiAlON and beta'-SiAlON.

In reference to Table 4A, the value of "z" for the beta SiAlOn phase was determined using the following formulas for "$z_a$", "$z_c$", and "$z_{c/a}$":

$z_a$=a−7.60442/0.3

$z_c$=c−2.90751/0/027

$z_{c/a}$=(c/a−0.38226)/0/002

In the above formulas, the value "a" is the "a" unit cell dimension in the beta SiAlON phase and the value "c" is the "c" unit cell dimension in the beta SiAlON phase. These formulas are set forth in U.S. Pat. No. 7,049,256 to Yeckley at Column 17, wherein the patent is hereby incorporated by reference herein. The "z" value set forth in Table 4A, which is the "z" value for the beta SiAlON phase of the formula ($Si_{6-z}Al_zO_zN_{8-z}$), is the average of the above three "z" values, i.e., $z_a$, $z_c$, and $z_{c/a}$.

Figure 2:
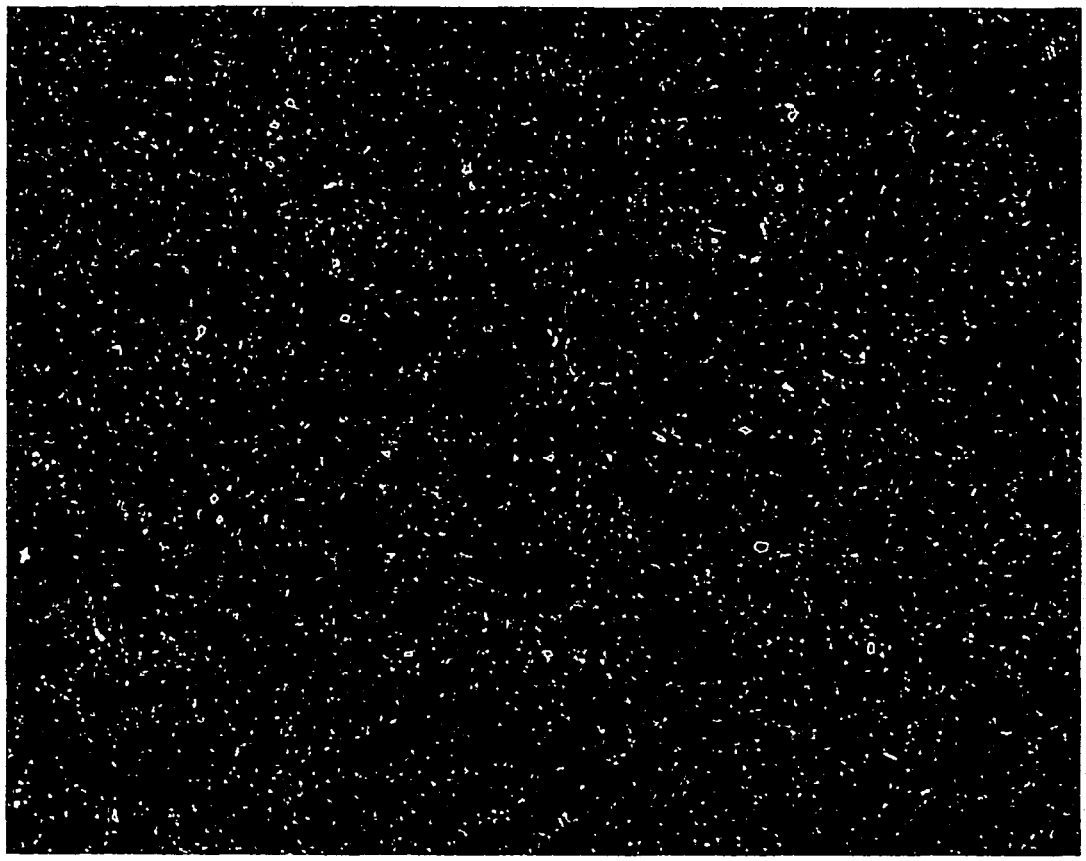
FIG. 2 is a photomicrograph that is a backscatter image taken via scanning electron microscopy (with a scale of 30 micrometers) of the ceramic Batch No. 2833B wherein the white phase is the rare earth alumina silicate grain boundary phase, the medium gray phase are grains of the alpha SiAlON phase, and dark regions comprise the beta SiAlON phase.
Figure 3:
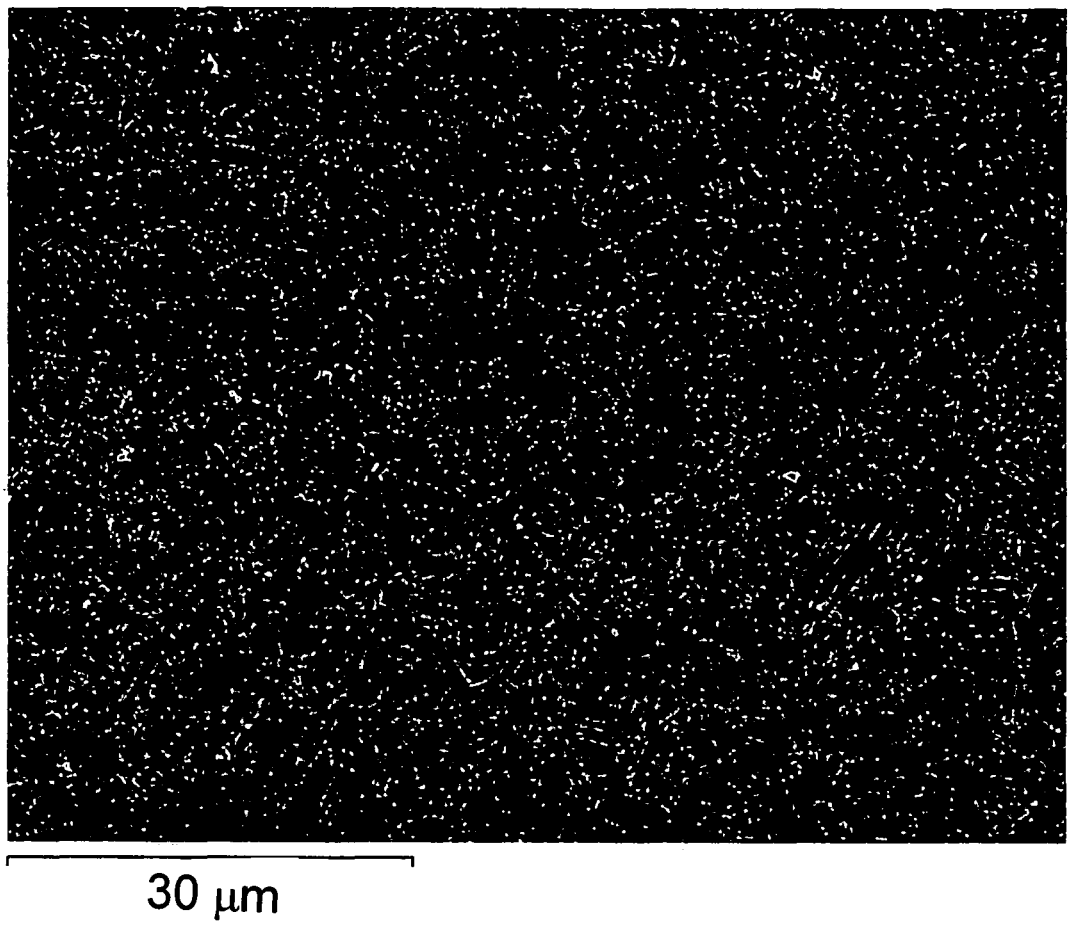
FIG. 3 is a photomicrograph that is a backscatter image taken via scanning electron microscopy (with a scale of 30 micrometers) of the ceramic Batch No. 2833C wherein the white phase is the rare earth alumina silicate grain boundary phase, the medium gray phase are grains of the alpha SiAlON phase, and dark regions comprise the beta SiAlON phase.
Figure 4:
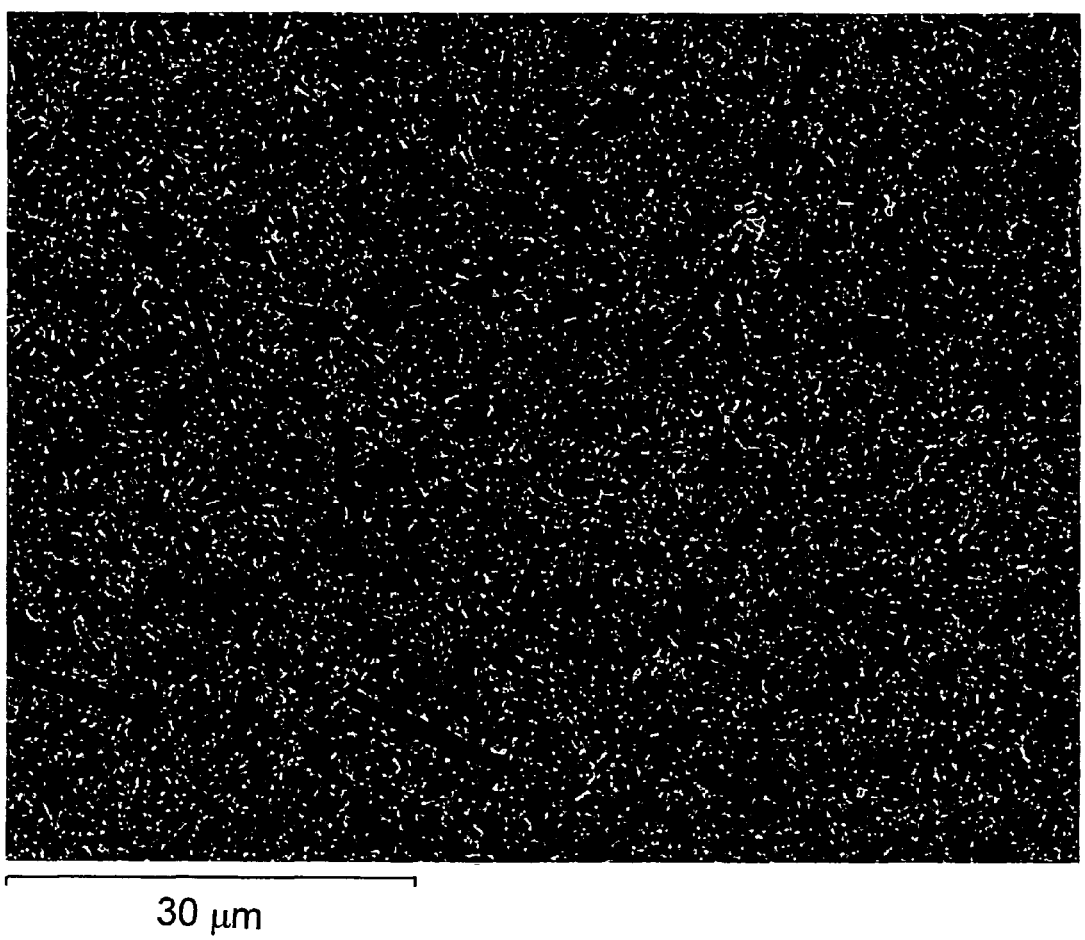
FIG. 4 is a photomicrograph that is a backscatter image taken via scanning electron microscopy (with a scale of 30 micrometers) of the ceramic Batch No. 2833D wherein the white phase is the rare earth alumina silicate grain boundary phase, the medium gray phase are grains of the alpha SiAlON phase, and dark regions comprise the beta SiAlON phase.

In reference to the photomicrographs, FIGS. 1 through 4 show the microstructure for Batches Nos. 2833A through 2833D. In this regard, FIG. 1 is a photomicrograph that is a backscatter image taken via scanning electron microscopy (with a scale of 30 micrometers) of the ceramic Batch No. 2833A wherein the white phase is the rare earth alumina silicate grain boundary phase, the medium gray phase are grains of the alpha SiAlON phase, and dark regions comprise the beta SiAlON phase. FIG. 2 is a photomicrograph that is a backscatter image taken via scanning electron microscopy (with a scale of 30 micrometers) of the ceramic Batch No. 2833B wherein the white phase is the rare earth alumina silicate grain boundary phase, the medium gray phase are grains of the alpha SiAlON phase, and dark regions comprise the beta SiAlON phase. FIG. 3 is a photomicrograph that is a backscatter image taken via scanning electron microscopy (with a scale of 30 micrometers) of the ceramic Batch No. 2833C wherein the white phase is the rare earth alumina silicate grain boundary phase, the medium gray phase are grains of the alpha SiAlON phase, and dark regions comprise the beta SiAlON phase. FIG. 4 is a photomicrograph that is a backscatter image taken via scanning electron microscopy (with a scale of 30 micrometers) of the ceramic Batch No. 2833D wherein the white phase is the rare earth alumina silicate grain boundary phase, the medium gray phase are grains of the alpha SiAlON phase, and dark regions comprise the beta SiAlON phase.

A review of the microstructure shown by FIGS. 1-4 reveals that for the 2833A-2833D compositions, the dominant phase is the alpha SiAlON phase (medium gray color) with the beta SiAlON phase (dark regions) somewhat uniformly distributed throughout the alpha SiAlON phase. There are a few white phases that appear to comprise a rare earth silicate grain boundary phase; however, these phases appear to be randomly distributed throughout the microstructure. The beta SiAlON grain frequency appears to be somewhat the same in FIGS. 1, 3 and 4 and this is consistent with the Diffraction results in Table 4. FIG. 2 displays a microstructure that exhibits a lesser density of the beta SiAlON phase. All photomicrographs show that many of the beta SiAlON grains develop a high aspect ratio which results in the ceramic body exhibiting good toughness.

Figure 5:
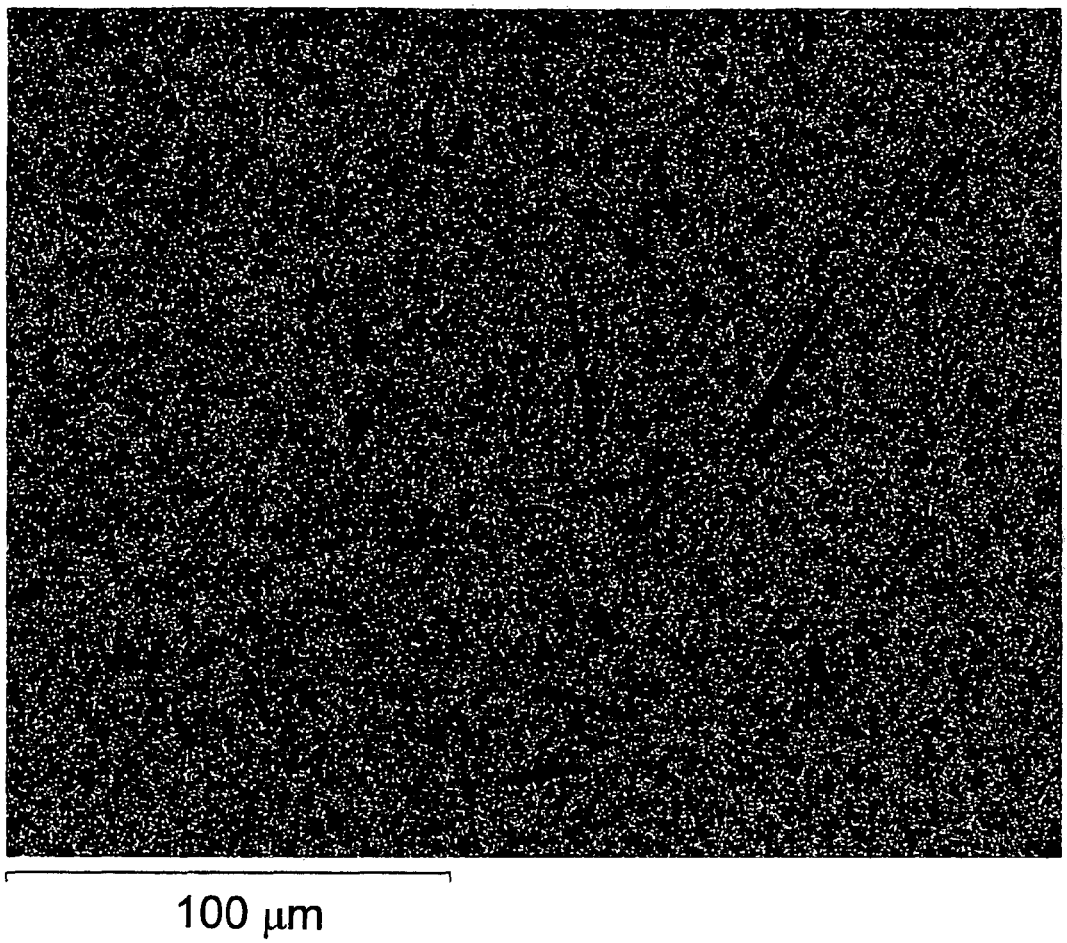
FIG. 5 is a photomicrograph that is a backscatter image taken via scanning electron microscopy (with a scale of 100 micrometers) of the ceramic Batch No. 3241A wherein the white phase is the rare earth alumina silicate grain boundary phase, the medium gray phase are grains of the alpha SiAlON phase, and dark regions comprise the beta SiAlON phase.

FIG. 5 is a photomicrograph that is a backscatter image taken via scanning electron microscopy (with a scale of 100 micrometers) of the ceramic Batch No. 3241A wherein (to the extent that it may be present) the white phase is the rare earth alumina silicate grain boundary phase, the medium gray phase are grains of the alpha SiAlON phase, and dark regions comprise the beta SiAlON phase. This photomicrograph shows that there may not be any rare earth alumina silicate phases present, and if they are, they display a minimal presence. The alpha SiAlON phase is the dominant phase and the beta SiAlON phase is somewhat uniformly distributed throughout the alpha SiAlON phase. The beta SiAlON phase develops a very high aspect ratio.

Figure 6:
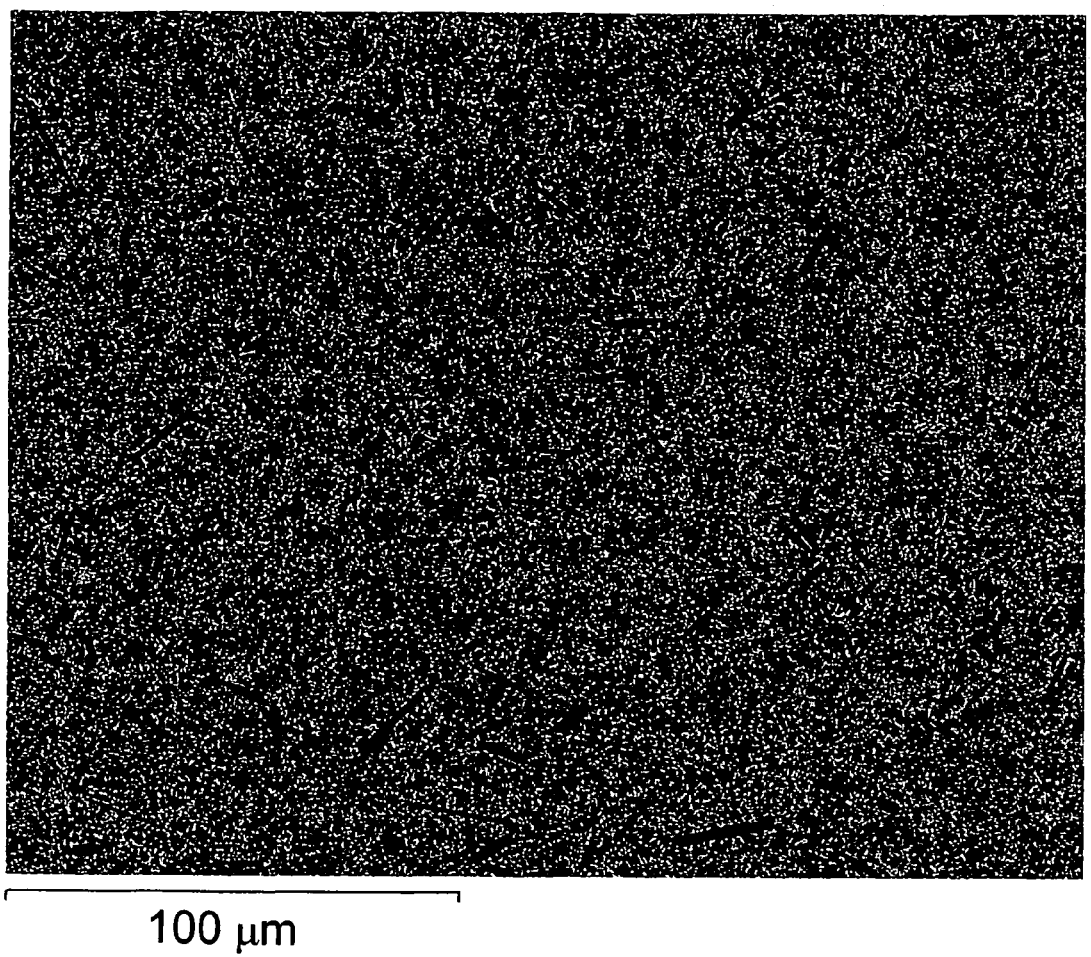
FIG. 6 is a photomicrograph that is a backscatter image taken via scanning electron microscopy (with a scale of 100 micrometers) of the ceramic Batch No. 3242A wherein the white phase is the rare earth alumina silicate grain boundary phase, the medium gray phase are grains of the alpha SiAlON phase, and dark regions comprise the beta SiAlON phase.
Figure 7:
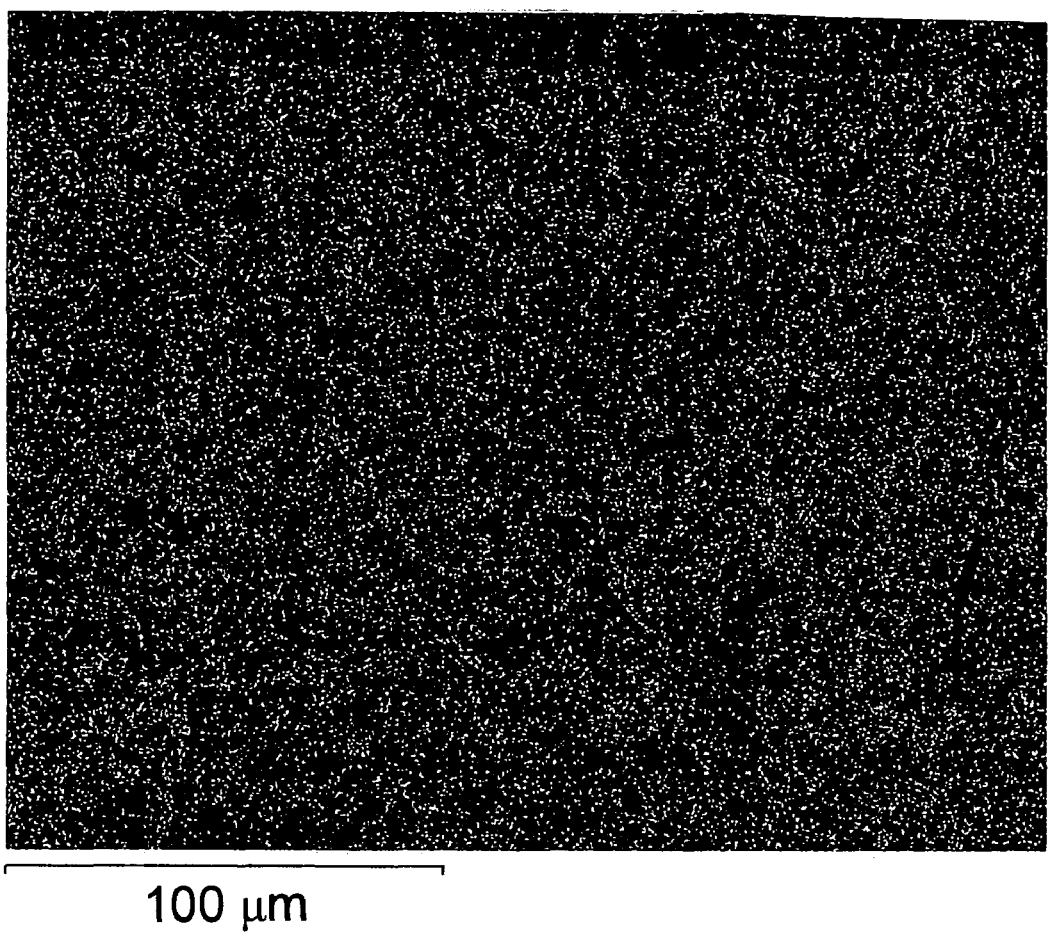
FIG. 7 is a photomicrograph that is a backscatter image taken via scanning electron microscopy (with a scale of 100 micrometers) of the ceramic Batch No. 3242B wherein the white phase is the rare earth alumina silicate grain boundary phase, the medium gray phase are grains of the alpha SiAlON phase, and dark regions comprise the beta SiAlON phase.

FIGS. 6 and 7 show the microstructure for samples of Batches Nos. 3242A and 3242B. More specifically, FIG. 6 is a photomicrograph that is a backscatter image taken via scanning electron microscopy (with a scale of 100 micrometers) of the ceramic Batch No. 3242A wherein the white phase (to the extent that is my be present) is the rare earth alumina silicate grain boundary phase, the medium gray phase are grains of the alpha SiAlON phase, and dark regions comprise the beta SiAlON phase. FIG. 7 is a photomicrograph that is a backscatter image taken via scanning electron microscopy (with a scale of 100 micrometers) of the ceramic Batch No. 3242B wherein the white phase (to the extent that is my be present) is the rare earth alumina silicate grain boundary phase, the medium gray phase are grains of the alpha SiAlON phase, and dark regions comprise the beta SiAlON phase.

These photomicrographs show the alpha SiAlON phase is the dominant phase and the beta SiAlON phase somewhat uniformly distributed throughout the alpha SiAlON phase. It also appears that the density of the beta SiAlON phase may be somewhat greater in FIG. 6 than the density of the beta SiAlON phase in FIG. 7.

In those compositions that contain lanthanum, the lanthanum is contained in the amorphous phase.

Applicant has believes that the amount of the beta silicon nitride in the starting silicon nitride powder has an impact upon the amount of the alpha prime SiAlON phase present in the as-sintered microstructure. This aspect is described in more detail in U.S. Pat. No. 6,693,054 to Yeckley mentioned above.

More specifically, as the amount of beta silicon nitride in the starting silicon nitride powder increases, the amount of alpha prime SiAlON phase in the as-sintered microstructure decreases. Applicant further believes that the higher toughness of the SiAlON ceramic body is obtained when the silicon nitride starting powder has either no low contains either no or a low amount of (i.e., an amount that has a lower limit equal to zero weight percent and an upper limit equal to about 1.6 weight percent or as another alternative, a lower limit equal to zero weight percent and an upper limit equal to about 3 weight percent) beta silicon nitride. In regard to each one of the batches, the content of the beta-silicon nitride in the starting silicon nitride powder mixture was zero weight percent and the content of the alpha-silicon nitride in the starting silicon nitride powder was about one hundred weight percent (keeping in mind that there may be some impurities).

The amount of beta silicon nitride in the starting powder mixture may be controlled in one of two ways. One way is to blend predetermined amounts of two or more silicon nitride powders wherein the alpha and beta contents of each powder is known so as to achieve a silicon nitride powder of a known beta content. The other way is to take 100 percent alpha silicon nitride powder and add a selected amount of 100 percent beta silicon nitride powder to it to achieve a silicon nitride powder of a known beta content. This latter way facilitates control of the particle size of the beta silicon nitride component.

Referring to the impact of the beta silicon nitride content of the starting silicon nitride powder, as described hereinabove, although applicant does not intend to be restricted by any particular theory, applicant believes that the beta silicon nitride particles are seeds for the nucleation and growth of the beta prime SiAlON grains. As the number of the beta silicon nitride particles increases, the beta prime SiAlON grains impinge each other sooner so as to limit the formation of high aspect ratio beta prime SiAlON grains. In addition, as the number of the beta silicon nitride particles increase, the content of the alpha prime SiAlON grains decreases. The use of fewer beta silicon nitride particles in the starting powder mixture results in a limited number of nucleation sites for the beta prime SiAlON grains to grow into the alpha prime SiAlON matrix during sintering. This results in beta prime SiAlON grains with a higher aspect ratio which causes a toughening of the alpha prima SiAlON phase matrix.

Applicant believes that the lanthanum (preferably added in the form of lanthanum oxide) forms a liquid phase and also does not become a part of the alpha prime SiAlON phase. In other words, the alpha prime SiAlON, which has the formula $RE_xSi_{12-(m+n)}Al_{m+n}O_nN_{16-n}$ where RE is the rare earth contribution (which could be a contribution of one or more are earths excluding La and Ce), does not contain essentially any detectable amount of lanthanum so that RE in the formula essentially cannot include lanthanum. Because the lanthanum does not form an alpha prime SiAlON phase (or at least essentially no detectable amount of lanthanum is in the alpha prime SiAlON phase) the liquid phase exists at the sintering temperature and through the sintering process because the alpha prime SiAlON phase (or the beta prime SiAlON phase) does not consume the lanthanum contained in the liquid phase. Applicant believes that the presence of the liquid phase during the early portion of the sintering process enhances the formation of the alpha prime SiAlON phase wherein the other rare earth elements (preferably added to the starting powder mixture in the form of their oxides) become a part of the alpha prime SiAlON phase (i.e., the one or more other rare earth elements comprise RE in the above formula). Applicant believes that the use of cerium would also cause formation of a liquid phase wherein cerium would not become a part of the alpha prime SiAlON phase.

Overall, the present invention provides an improved ceramic armor material that comprises an alpha SiAlON phase and a beta SiAlON phase, as well as optional other phases.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A SiAlON ceramic armor made from a starting powder mixture, the ceramic armor comprising:
   a ceramic body comprising between about 60 weight percent and about 98 weight percent alpha SiAlON phase that contains an alpha SiAlON-bound rare earth element and between about 2 weight percent and about 40 weight percent of a beta SiAlON phase of the formula $Si_{6-z}Al_zO_zN_{8-z}$ wherein the value of "z" ranges between about 0.2 and about 1.0;
   the ceramic body further comprising sintering aid residue present as a result of the starting powder mixture containing between about 4 weight percent and about 14 weight percent of an oxide of an alpha SiAlON-bound rare earth element, and between about 0.5 weight percent and about 5 weight percent of an oxide of an unbound rare earth element, and the alpha SiAlON-bound rare earth element being different from the unbound rare earth element; and
   the ceramic body having a fracture toughness ($K_{IC}$) greater than about 6.00 MPa·m$^{1/2}$ and a Vickers hardness ($H_{VN}$) equal to greater than about 17.5 GPa.

2. The SiAlON ceramic armor according to claim 1 comprising between about 69 weight percent and about 85 weight percent of the alpha SiAlON phase, and the fracture toughness ($K_{IC}$) being greater than about 6.50 MPa·m$^{1/2}$ and the Vickers hardness ($H_{VN}$) being equal to greater than about 17.7 GPa.

3. The SiAlON ceramic armor according to claim 1 comprising between about 60 weight percent and about 75 weight percent of the alpha SiAlON phase, and the fracture toughness ($K_{IC}$) being greater than about 7.00 MPa·m$^{1/2}$ and the Vickers hardness ($H_{VN}$) being equal to greater than about 19 GPa.

4. The SiAlON ceramic armor according to claim 1 wherein the alpha SiAlON-bound rare earth element is selected from the group consisting of ytterbium, Y, Pr, Nd, Pm, Sm, Eu, Gd, Tb, Dy, Ho, Er, Tm, and Lu, and the unbound rare earth element is selected from the group consisting of lanthanum and cerium.

5. The SiAlON ceramic armor according to claim 1 wherein the alpha SiAlON-bound rare earth element is ytterbium, and the unbound rare earth element is lanthanum.

6. A SiAlON ceramic armor comprising:
   a ceramic body comprising an alpha SiAlON phase and a beta SiAlON phase of the formula $Si_{6-z}Al_zO_zN_{8-z}$ wherein the value of "z" ranges between about 0.2 and about 1.0, and the ceramic body being made from a starting powder mixture comprising between about 65 weight percent and about 85 weight percent silicon nitride, between about 5 weight percent and about 15 weight percent aluminum nitride, between about 0.25 weight percent and about 9 weight percent alumina, between about 4 weight percent and about 14 weight percent of an oxide of an alpha SiAlON-bound rare earth element, between about 0.5 weight percent and about 1 weight percent of an oxide of an unbound rare earth element, and the alpha SiAlON-bound rare earth element being different from the unbound rare earth element;
   the ceramic body having a fracture toughness ($K_{IC}$) greater than about 6.00 MPa·m$^{1/2}$ and a Vickers hardness ($H_{VN}$) equal to greater than about 17.5 GPa.

7. The SiAlON ceramic armor according to claim 6 wherein the starting powder mixture comprising between about 80 weight percent and about 85 weight percent silicon nitride, between about 5 weight percent and about 7 weight percent aluminum nitride, between about 1 weight percent and about 2 weight percent alumina, between about 8 weight percent and about 9 weight percent of an oxide of an alpha SiAlON-bound rare earth element; and the ceramic body having a fracture toughness ($K_{IC}$) greater than about 7.5 MPa·m$^{1/2}$ and a Vickers hardness ($H_{VN}$) equal to greater than about 18 GPa.

8. The SiAlON ceramic armor according to claim 6 wherein the starting powder mixture comprising between about 75 weight percent and about 80 weight percent silicon nitride, between about 9 weight percent and about 10 weight percent aluminum nitride, between about 3 weight percent and about 4 weight percent alumina, between about 9 weight percent and about 11 weight percent of an oxide of an alpha SiAlON-bound rare earth element; and the ceramic body having a fracture toughness ($K_{IC}$) greater than about 6.5 MPa·m$^{1/2}$ and a Vickers hardness ($H_{VN}$) equal to greater than about 20 GPa.

9. The SiAlON ceramic armor according to claim 6 wherein the starting powder mixture comprising between about 80 weight percent and about 85 weight percent silicon nitride, between about 5 weight percent and about 7 weight percent aluminum nitride, between about 1 weight percent and about 2 weight percent alumina, between about 8 weight percent and about 9 weight percent of an oxide of an alpha SiAlON-bound rare earth element; and the ceramic body having a fracture toughness ($K_{IC}$) greater than about 7.5 MPa·m$^{1/2}$ and a Vickers hardness ($H_{VN}$) equal to greater than about 19 GPa.

10. The SiAlON ceramic armor according to claim 6 wherein the starting powder mixture comprising between about 80 weight percent and about 85 weight percent silicon nitride, between about 6 weight percent and about 8 weight percent aluminum nitride, between about 1 weight percent and about 2 weight percent alumina, between about 9 weight percent and about 11 weight percent of an oxide of an alpha SiAlON-bound rare earth element; and the ceramic body having a fracture toughness ($K_{IC}$) greater than about 7.00 MPa·m$^{1/2}$ and a Vickers hardness ($H_{VN}$) equal to greater than about 19.5 GPa.

11. The SiAlON ceramic armor according to claim 6 wherein the silicon nitride starting powder comprises less than or equal to about 3 weight percent beta silicon nitride and equal to or greater than about 97 weight percent alpha silicon nitride.

12. The SiAlON ceramic armor according to claim 6 wherein the alpha SiAlON-bound rare earth element is selected from the group consisting of ytterbium, Y, Pr, Nd, Pm, Sm, Eu, Gd, Tb, Dy, Ho, Er, Tm, and Lu, and the unbound rare earth element is selected from the group consisting of lanthanum and cerium.

13. The SiAlON ceramic armor according to claim 6 wherein the alpha SiAlON-bound rare earth element is ytterbium, and the unbound rare earth element is lanthanum.

14. A SiAlON ceramic armor made from a starting powder mixture, the ceramic armor comprising:

a ceramic body comprising between about 85 weight percent and about 98 weight percent alpha SiAlON phase that contains an alpha SiAlON-bound rare earth element, and between about 2 weight percent and about 6 weight percent beta SiAlON phase of the formula $Si_{6-z}Al_zO_zN_{8-z}$ wherein the value of "z" ranges between about 0.2 and about 1.0, and between about 1 weight percent and about 30 weight percent silicon carbide;

the ceramic body further comprising sintering aid residue present as a result of the starting powder mixture containing between about 4 weight percent and about 14 weight percent of an oxide of an alpha SiAlON-bound rare earth element and between about 0.5 weight percent and about 5 weight percent of an oxide of an unbound rare earth element, and the alpha SiAlON-bound rare earth element being different from the unbound rare earth element; and the ceramic body having a fracture toughness ($K_{IC}$) greater than about 6.00 M·Pa m$^{1/2}$ and a Vickers hardness ($H_{VN}$) equal to greater than about 17.5 GPa.

15. The SiAlON ceramic armor according to claim 14 wherein the alpha SiAlON-bound rare earth element is selected from the group consisting of ytterbium, Y, Pr, Nd, Pm, Sm, Eu, Gd, Tb, Dy, Ho, Er, Tm, and Lu, and the unbound rare earth element is selected from the group consisting of lanthanum and cerium.

16. The SiAlON ceramic armor according to claim 14 wherein the alpha SiAlON-bound rare earth element is ytterbium, and the unbound rare earth element is lanthanum.

17. A SiAlON ceramic armor comprising:
a ceramic body comprising an alpha SiAlON phase and a beta SiAlON phase of the formula $Si_{6-z}Al_zO_zN_{8-z}$ wherein the value of "z" ranges between about 0.2 and about 1.0, and the ceramic body being made from a starting powder mixture comprising between about 70 weight percent and about 85 weight percent silicon nitride, between about 5 weight percent and about 12 weight percent aluminum nitride, between about 1 weight percent and about 7 weight percent alumina, between about 4 weight percent and about 14 weight percent of an oxide of an alpha SiAlON-bound rare earth element, between about 0.1 weight percent and about 5 weight percent of an unbound rare earth element, and the alpha SiAlON-bound rare earth element being different from the unbound rare earth element, and between about 1 weight percent and about 30 weight percent silicon carbide; and the ceramic body having a fracture toughness ($K_{IC}$) greater than about 6.00 MPa·m$^{1/2}$ and a Vickers hardness ($H_{VN}$) equal to greater than about 17.5 GPa.

18. The SiAlON ceramic armor according to claim 17 wherein the alpha SiAlON-bound rare earth element is selected from the group consisting of ytterbium, Y, Pr, Nd, Pm, Sm, Eu, Gd, Tb, Dy, Ho, Er, Tm, and Lu, and the unbound rare earth element is selected from the group consisting of lanthanum and cerium.

19. The SiAlON ceramic armor according to claim 17 wherein the alpha SiAlON-bound rare earth element is ytterbium, and the unbound rare earth element is lanthanum.

20. The SiAlON ceramic armor according to claim 17 wherein the silicon carbide being present in the starting powder mixture in an amount between about 5 weight percent and about 15 weight percent of the starting powder mixture.

21. The SiAlON ceramic armor according to claim 17 wherein the silicon nitride starting powder comprises less than or equal to about 3 weight percent beta silicon nitride and equal to or greater than about 97 weight percent alpha silicon nitride.

22. A SiAlON ceramic armor made from a starting powder mixture, the ceramic armor comprising:
a ceramic body comprising between about 60 weight percent and about 98 weight percent alpha SiAlON phase that contains an alpha SiAlON-bound rare earth element and between about 2 weight percent and about 40 weight percent of a beta SiAlON phase of the formula $Si_{6-z}Al_zO_zN_{8-z}$ wherein the value of "z" ranges between about 0.2 and about 1.0, and sintering aid residue present as a result of the starting powder mixture containing between about 0.5 weight percent and about 5 weight percent of an oxide of an unbound rare earth element, and the alpha SiAlON-bound rare earth element being different from the unbound rare earth element; and the ceramic body having a fracture toughness ($K_{IC}$) greater than about 6.00 MPa·m$^{1/2}$ and a Vickers hardness ($H_{VN}$) equal to greater than about 17.5 GPa.

23. A SiAlON ceramic armor produced by the process comprising the steps of:
providing a starting powder mixture comprising between about 70 weight percent and about 85 weight percent silicon nitride, between about 5 weight percent and about 12 weight percent aluminum nitride, between about 1 weight percent and about 7 weight percent alumina, between about 4 weight percent and about 14 weight percent of an oxide of an alpha SiAlON-bound rare earth element, between about 0.5 weight percent and about 5 weight percent of an oxide of an unbound rare earth element, and the alpha SiAlON-bound rare earth element being different from the unbound rare earth element; and pressing the starting powder mixture into a green compact; and consolidating the green compact into a consolidated ceramic body comprising an alpha SiAlON phase and a beta SiAlON phase of the formula $Si_{6-z}Al_zO_zN_{8-z}$ wherein the value of "z" ranges between about 0.2 and about 1.0, and wherein the ceramic body having a fracture toughness ($K_{IC}$) greater than about 6.00 MPa·m$^{1/2}$ and a Vickers hardness ($H_{VN}$) equal to greater than about 17.5 GPa.

24. The SiAlON ceramic armor according to claim 23 wherein the starting powder mixture further containing between about 1 weight percent and about 30 weight percent silicon carbide.

25. The SiAlON ceramic armor according to claim 23 wherein the consolidation step comprises the steps of sintering the green compact into a sintered compact, and then hot isostatically pressing the sintered compact into the consolidated ceramic body.

26. The SiAlON ceramic armor according to claim 23 wherein the consolidation step comprises pressure sintering the green compact into the consolidated ceramic body.

* * * * *